United States Patent [19]

Ramsey et al.

[11] Patent Number: 4,946,122
[45] Date of Patent: Aug. 7, 1990

[54] POST CLAMP

[75] Inventors: John K. Ramsey, Mansfield; Erwin H. Meyn, Broadview Hts., both of Ohio

[73] Assignee: The United States of America as represented by the Administrator of the National Aeronautics and Space Administration, Washington, D.C.

[21] Appl. No.: 414,816
[22] Filed: Sep. 29, 1989
[51] Int. Cl.$^5$ ............................................. F16M 13/00
[52] U.S. Cl. ................................... 248/229; 248/230; 403/385; 403/391
[58] Field of Search .................... 248/229, 316.1, 904, 248/124, 541, 230, 231.2, 279, 295.1, 540; 403/385, 391, 373, 290

[56] References Cited

U.S. PATENT DOCUMENTS

| | | | |
|---|---|---|---|
| 376,659 | 1/1888 | Kelly | 248/229 |
| 2,767,003 | 10/1956 | Gilmont | 248/124 X |
| 2,919,091 | 12/1959 | Vander Cook | 248/230 X |
| 2,958,110 | 11/1960 | McBrien | 403/400 X |
| 2,970,798 | 2/1961 | Fritchle et al. | 248/229 |
| 4,129,280 | 12/1977 | Ruegg et al. | 248/183 |
| 4,299,370 | 11/1981 | Monticelli et al. | 248/278 |
| 4,365,778 | 12/1982 | Joussemet | 248/229 |
| 4,426,055 | 3/1982 | Reedy et al. | 248/184 |
| 4,483,334 | 11/1984 | Murray | 403/400 X |
| 4,575,035 | 3/1986 | McDonough | 248/287 |
| 4,624,429 | 11/1986 | Miyazaki | 248/56 |

Primary Examiner—Karen J. Chotkowski
Attorney, Agent, or Firm—Gene E. Shook; John R. Manning; James A. Mackin

[57] ABSTRACT

A pair of spaced collars are mounted at right angles on a clamp body by retaining rings which enable the collars to rotate with respect to the clamp body. Mounting posts extend through aligned holes in the collars and clamp body. Each collar can be clamped onto the inserted post while the clamp body remains free to rotate about the post and collar. The clamp body is selectively clamped onto each post.

14 Claims, 4 Drawing Sheets

POST CLAMP

ORIGIN OF THE INVENTION

The invention described herein was made by employees of the United States Government and may be manufactured and used by or for the Government for governmental purposes without the payment of any royalties thereon or therefor.

TECHNICAL FIELD

This invention is concerned with apparatus for positioning and clamping two circular posts or rods at right angles to each other. The invention is particularly concerned with such a device which enables the posts to be rotated in perpendicular planes about each other without any translation of motion from one post with respect to the other.

Lasers and optical components are often mounted using posts with some type of post-mounting hardware. To supply a sufficient number of degrees of freedom for alignment of lasers and optical components, often two posts are joined at right angles to each other using a post clamp.

The typical setup of the prior art is shown in FIG. 1 wherein a first post 10 is connected to a stationary fixture while a second post 12 is connected to a laser holder or the like. Such a setup provides for translation of the second post 12 in the Y-direction with respect to the first post 10 and rotation of the second post 12 about the first post 10 when a quarter turn screw 14 and washer are loosened. When a similar quarter turn screw 16 and washer are loosened the post 12 can translate in the X-direction with respect to post 10 and a post clamp 18. The second post 12 can also rotate about its own axis, the X-axis, within the body of the post clamp 18.

The disadvantage of this type of clamp is that if it is desired to rotate one post about another the clamp will invariably translate along the post that it is being rotated about. More particularly, loosening a single quarter turn screw provides two new degrees of freedom, i.e. rotational and translational. This makes it difficult to make an adjustment of one degree of freedom, such as rotational, without affecting the other degree of freedom, such as translational.

Referring again to FIG. 1, if it is desired to rotate the second post 12 about the first post 10, the quarter turn screw 14 must be loosened. However, loosening this screw allows tranlation of the post clamp 18 along the first post 10 in the Y-direction as well as rotation of the post clamp 18 about the first post 10 which is the Y-axis. It is extremely difficult to rotate the second post 12 about the first post 10 while maintaining the same vertical position of the second post 12 on the post 10. It is just as difficult to rotate the second post 12 in the post clamp 18 about its own axis, X while preventing translation perpendicular to the first post 10 through the post clamp 18 in the X-direction. This makes it difficult to set up lasers and optical components in a precise manner.

To alleviate the above problems of the prior art, post collars are often used. FIG. 2 shows a typical setup using post collars 20 and 22. The first post collar 20 is secured to a first post 24 with a first thumbscrew 26 which is brought to bear on the post 24 by turning. A second thumbscrew 28 functions in a similar manner.

The post collar 20 on the first post 24 enables a second post 30 to rotate about the first post 24 without any vertical translation of the second post 30 along the first post 24 as long as contact is maintained between the collar 20 and a post clamp 32. Likewise, the post collar 22 on the second post 30 permits this post to be rotated about its own axis without any translation of the post through the post clamp 32 with respect to the first post 24 as long as contact is maintained between the collar 22 and the post clamp 32.

There are, however, disadvantages to using the setup shown in FIG. 2 which utilizes post collars. If it is desired to position the second post 30 a vertical distance H on the first post 24 and at a rotational angle of Q degrees on post 24, the following sequence must be performed:

(1) The post clamp 32 must be clamped a vertical distance H on the first post 24.
(2) The post collar 20 must be secured below and against the post clamp 32 by the first thumbscrew 26.
(3) The post clamp 32 must be loosened and the second post 30 rotated Q degrees about the first post 24.
(4) The post clamp 32 must be retightened by using a quarter turn screw 34 and washer.

This procedure requires four separate actions. In reality, it is rate that a precise distance H or rotation angle Q is known in advance. It is more the norm to make many iterative adjustments when aligning laser beams with optical components. Often the lasers are separated from the optical components by such a distance that any slight adjustment at the laser will result in a large displacement of the laser beam at the optical component. Therefore, the aforementioned process is both time consuming and tedious.

The process is further complicated by the fact that the post collars 20 and 22 are separate from the post clamp 32. This requires a momentary clamping of the post clamp so that the workers hands are free to secure the post collar in place.

The disadvantage of using the post collars 20 and 22 is that each is secured by a single thumbscrew 26 and 28 respectively. When excessive torque is applied to these thumbscrews it is possible to mar or scratch the respective posts 24 or 30 if the screw is made of a harder material than the post. When either the first post 24 or the second post 30 is marred or scratched, it is difficult to slide the post clamp 32 along the post.

It is, therefore, an object of the present invention to provide apparatus for use in the precise alignment of optical devices which utilizes fewer steps than prior art devices.

Another object of the invention is to provide such an apparatus in which the post clamp collar is an integral part of the post clamp body to provide a more convenient and efficient mechanism.

BACKGROUND ART

Ruegg et al U.S. Pat. No. 4,129,280 is directed to a clamp with two degrees of freedom. A resilient spring provides braking to minimize positioning problems.

Monticelli et al U.S. Pat. No. 4,299,370 describes a fixture having translation and rotation about an axis which may be handled independently. Two knobs control these characteristics.

Reedy et al U.S. Pat. No. 4,426,055 covers apparatus for aligning optical devices. McDonough U.S. Pat. No. 4,575,033 shows a typical post clamp.

DISCLOSURE OF THE INVENTION

The aforementioned objects of the invention are achieved by a post clamp assembly fabricated and assembled in accordance with the present invention. This assembly utilizes post clamp collars which are retained in a post clamp body by retaining rings. This enables the post clamp collars to rotate with respect to the post clamp body.

Mounting posts are installed through holes in the post clamp body and collar respectively. Quarter turn screws in conjunction with machined slots are used on the post clamp body as well as the post clamp collars to provide clamping action. The post clamp collar can be secured to a post while still enabling the post clamp body to remain free to rotate about the post and post clamp collar.

The post clamp collar acts as an anchor to prevent translation of the post clamp body along the post during rotation of the post clamp body. This structure enables the post clamp body to rotate while remaining in a plane perpendicular to the post. Once a post clamp collar is secured to a post, the post clamp body can be rotated to its position where it can be secured to the post by tightening its quarter turn screw.

BRIEF DESCRIPTION OF THE DRAWINGS

Details of the invention will be more fully described when taken with the accompanying drawings in which.

BEST MODE FOR CARRYING OUT THE INVENTION

Figure 3:
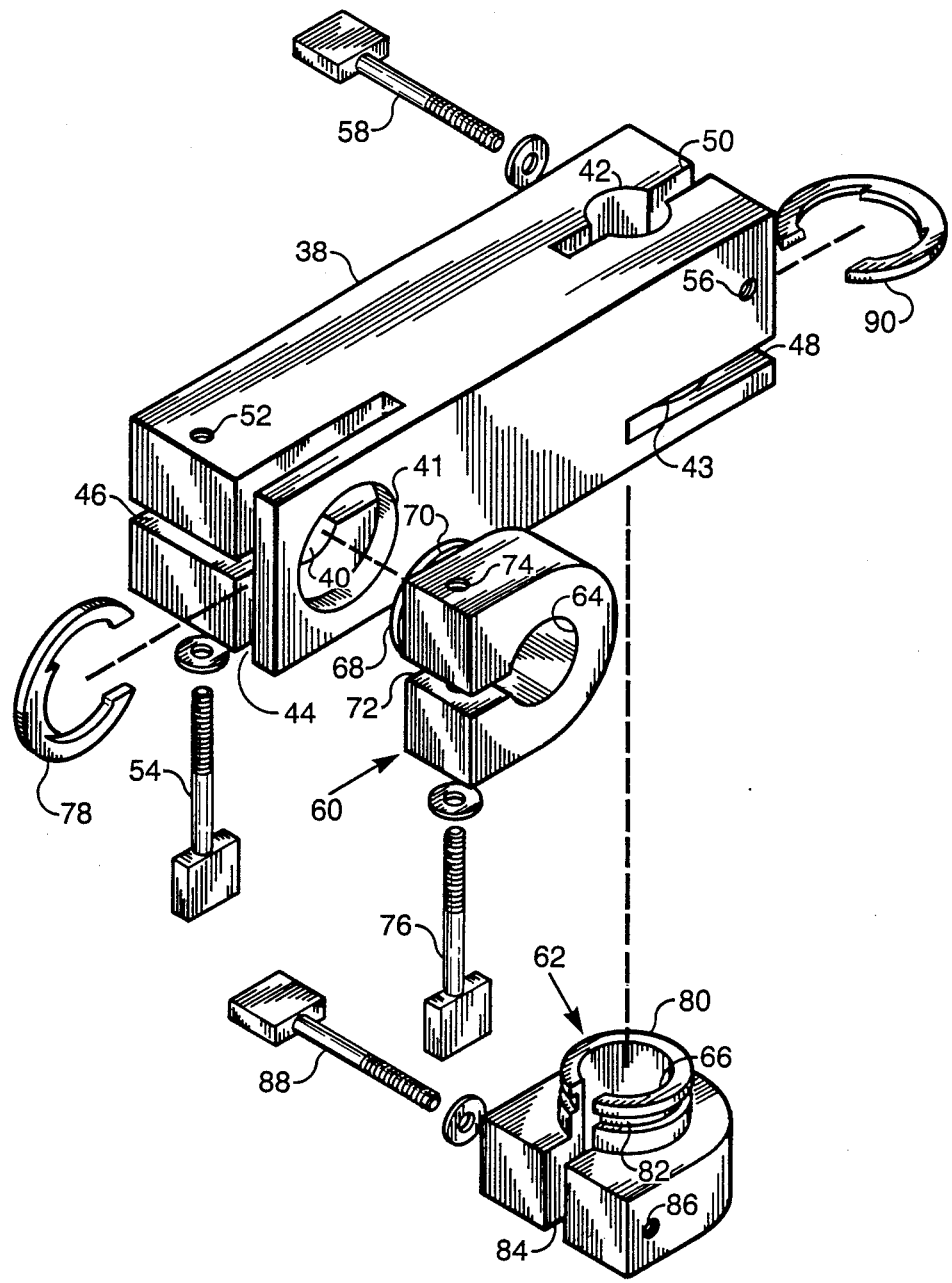
FIG. 3 is an exploded view of a post clamp assembly constructed in accordance with the present invention.
Figure 4:
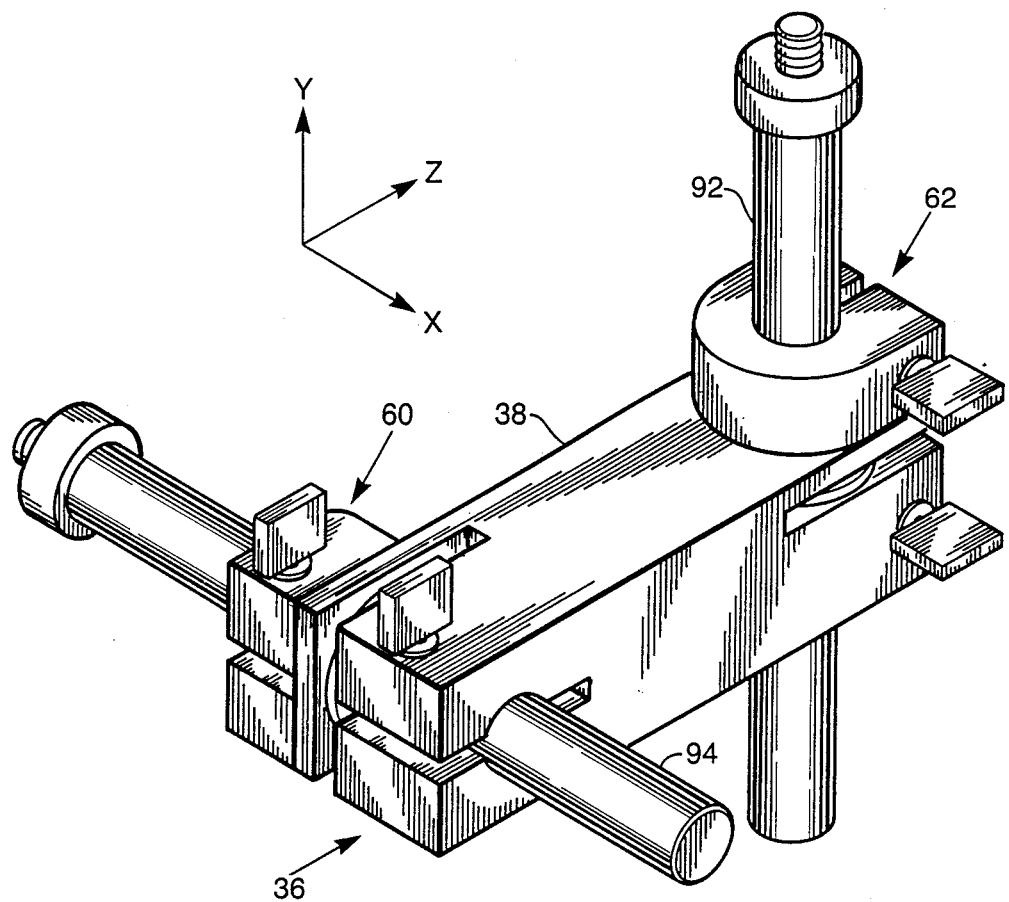
FIG. 4 is a perspective view of a post clamp assembly embodying the features of the present invention.

Referring now to the drawings there is shown in FIG. 4 a post clamp assembly 36 constructed in accordance with the present invention. As shown in FIG. 3, the post clamp assembly utilizes a post clamp body 38 in the form of an elongated block of a suitable metal, such as aluminum, having a pair of offset passages extending therethrough at right angles to each other. One of these passages comprises a minor diameter bore 40 aligned with a major diameter bore 41 while the other passage comprises a minor diameter bore 42 aligned with a major diameter bore 43.

A pair of slots 44 and 46 are cut into the body 38 at right angles to each other adjacent to the minor diameter bore 40. A similar pair of right angle slots 48 and 50 are cut into the body 38 adjacent to the minor diameter bore 42.

The slot 44 extends into the body 38 from one end thereof normal to the axis of the bores 40 and 41 while the slot 46 likewise extends from the same end into the body along the bore 40 from the slot 44 to one face of the body 38. In a similar manner the slot 48 extends into the body 38 from the opposite end normal to the axis of the bores 42 and 43 while the slot 50 extends into the body 38 along the bore 42 from the slot 48 to another face of the body.

A suitable hole 52 extends through the body 38 and the slot 46. The hole 52 is threaded along one side of the slot 46 to receive a quarter turn screw 54 which passes through a suitable washer. Likewise, a similar hole 56 is provided at the opposite end of the body 38. The hole 56 extends through the body 38 and the slot 50. The hole 56 is threaded at one end to receive a quarter turn screw 58 which passes through a suitable washer. Tightening of the screws 54 and 58 clamp the body 38 onto the posts in the bores 40 and 42.

A pair of post clamp collars 60 and 62 are provided for use with the bores 41 and 43 respectively. More particularly, the collar 60 has a bore 64 for receiving a post while a similar bore 66 extends through the collar 62. The diameter of the bore 40 is substantially the same as the diameter of the bore 64. Likewise, the diameters of the bores 42 and 66 are substantially the same.

The collar 60 also has a cylindrical boss 68 with a circumferential recess 70 formed therein. The collar further includes a slot 72 which extends along the bore 64. A suitable hole 74 extends through the collar 60 adjacent to the slot 72. The hole 74 has a threaded portion on one end for receiving a quarter turn screw 76 which carries a washer. The boss 68 is adapted to be inserted into the bore 41 until the collar 60 engages the body 38. An E-type retaining ring 78 is inserted into the slot 44 and engages the boss 68 in the recess 70.

In a similar manner a boss 80 on the collar 62 has a recess 82 therein. The collar 62 further has a slot 84 which extends to the bore 66. A suitably threaded hole 86 receives a quarter turn screw 88 which carries a washer. The boss 80 is inserted into the bore 43 until the collar 62 engages the body 38. An E-type retaining ring 90 is inserted into the slot 48 to engage the recess 82 in the boss 80.

Referring now to FIG. 4 there is shown a post clamp assembly 36 mounted on a first post 92 which extends through the bore 66 in the post clamp collar 62. A second post 94 extends through the bore 64 in the collar 60. Thus the mounting posts 92 and 94 are installed through the bores 40 and 42 in the post clamp body 38 and the bores 64 and 66 in the collars 60 and 62 respectively. The post clamp collars 60 and 62 are rotatable with respect to the post clamp body 38 because they are retained in the body by the retaining rings 78 and 90.

The quarter turn screws 54, 58, 76, and 88 in conjunction with the slots 46, 50, 72, and 84, respectively, are used on the post clamp body 38 as well as the post clamp collars 60 and 62 to provide clamping action.

It is apparent each post clamp collar 60 and 62 can be secured to a post 92 and 94 while still allowing the post clamp body 38 to remain free to rotate about the post and post clamp collar. The post clamp collar acts as an anchor to prevent translation of the post clamp body along a post during rotation of the post clamp body. This assembly allows the post clamp body to rotate while remaining in a plane perpendicular to the post. Once the post clamp collar is secured to a post, the post clamp body can be rotated to its desired position where it can also be secured to the post by tightening its quarter turn screw.

ALTERNATE EMBODIMENT OF THE INVENTION

In an alternate embodiment it is contemplated that the quarter turn screws 54, 58, 76 and 88 may be eliminated by providing a collet on each post clamp collar 60 and 62. Such a collet would extend outward from the post clamp collar on the side opposite the boss which is inserted into the post clamp body 38. The post clamp collars 60 and 62 would be securely clamped onto the post 92 and 94 respectively by tightening the collet with a wrench mounted thereon.

Figure 2:
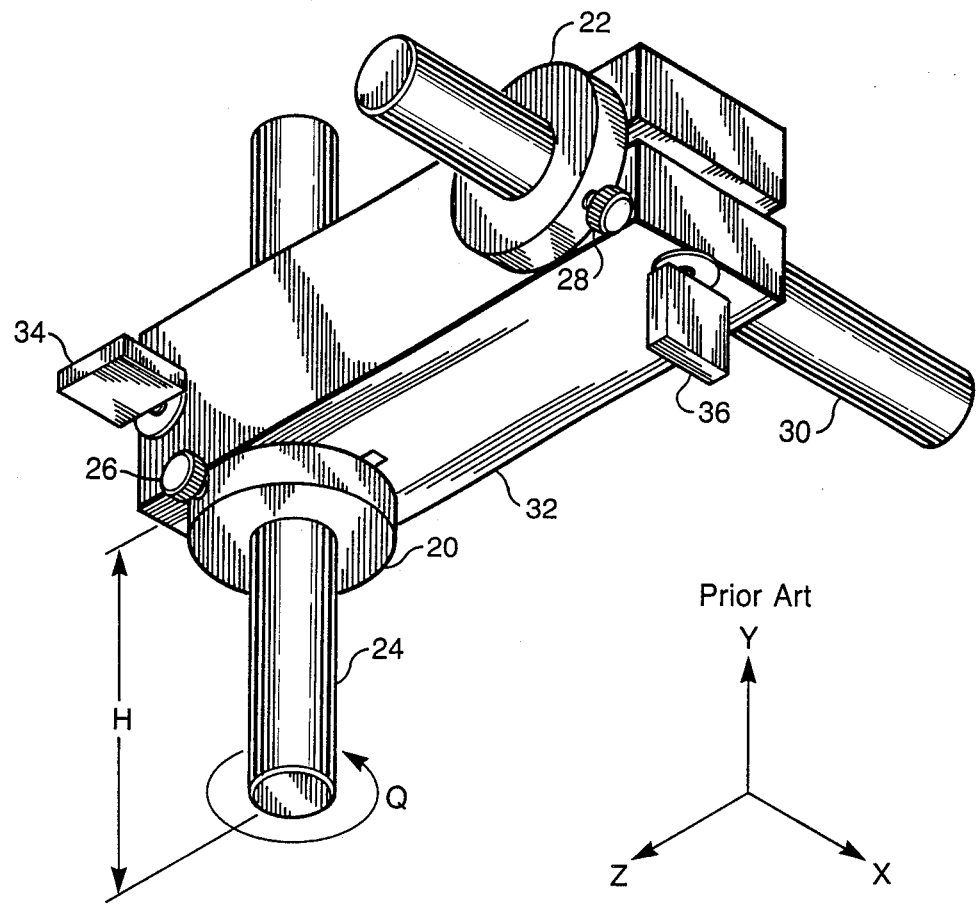
FIG. 2 is a perspective view of an improved prior art post clamp which solves some of the problems encountered in using the post clamp in FIG. 1.

It is apparent that because the post clamp collar is an integral part of a post clamp body a more convenient and efficient mechanism results. This reduces set up time and increases productivity. By way of example, if it is desired to position the post 94 in FIG. 4 a vertical distance, such as H, shown in FIG. 2 on the post 92 and a rotational angle Q, such as shown in FIG. 2, fewer steps would need to be performed with the post clamp of FIG. 4. More particularly, this could be accomplished in the following sequence:

(1) The post clamp assembly 36 would be translated a vertical distance H on the post 92 whereby the post clamp collar 62 would be tightened.

(2) A post clamp is still loose and would be rotated at angle Q where it would be tightened.

It is evident this procedure consists of two clamping actions as opposed to four clamping actions needed in the prior art shown in FIG. 2. This is a great advantage in aligning laser beams with optical components because such an operation is extremely iterative and tedious.

Another advantage is that the post clamp collar is secured to the post by a clamping action resulting from a reduction in diameter of the collar as opposed to the tightening of the thumbscrew as in the prior art. It is obvious that the present apparatus does not mar the post.

Figure 1:
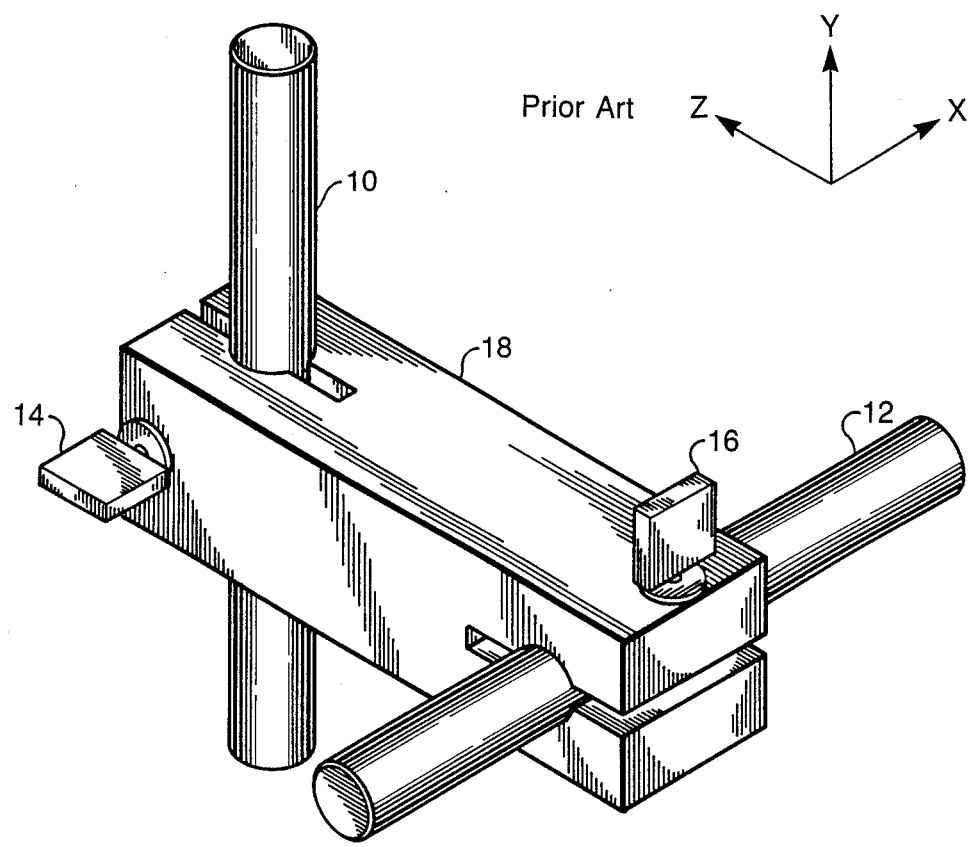
FIG. 1 is a perspective view of a prior art post clamp.

Another advantage is that the post clamp collar is retained in the post clamp by an E-type retaining ring. This feature allows the post clamp body to be suspended from the post clamp collar which enables a worker to freely rotate the post clamp without having to supply a force vertically to keep it in a given rotational plane. It is apparent that in the prior art shown in FIGS. 1 and 2 the post clamp body cannot be suspended from the post collar. The devices shown in FIGS. 1 and 2 would require the application of a vertical force on the post clamp body to keep it in contact with the post collar which is an unnecessary difficulty.

While several embodiments of the invention have been shown and described it will be apparent that various modifications may be made to the disclosed structure without departing from the spirit of the invention and the scope of the subjoined claims.

We claim:

1. Apparatus for positioning and clamping a pair of posts at right angles to each other comprising
  a body member having a pair of offset passages extending therethrough at right angles to each other, each of said offset passages comprising a minor bore portion and a major bore portion,
  a first clamp member having a first bore for receiving one of said posts,
  means on said first clamp member for selectively gripping said one post thereby preventing movement of said one post relative to said first clamp member,
  means for mounting said first clamp member for rotation in one of said major bore portions,
  means on said body member for selectively gripping said one post thereby preventing movement of the same relative to said body member,
  a second clamp member having a second bore for receiving the other of said posts,
  means on said clamp member for selectively gripping said other post thereby preventing movement of said other post relative to said second clamp member,
  means for mounting said second clamp member for rotation in the other of said major bore portions, and
  means on said body member for selectively gripping said other post thereby preventing movement of the same relative to said body member.

2. Apparatus as claimed in claim 1 wherein
  said first and second clamp members comprise collars having bosses thereon extending into the major bore portions of said passages, and
  means for retaining said bosses in said major bore portions for rotational movement while preventing translational movement of each of said clamp members relative to said body member.

3. Apparatus as claimed in claim 2 including a pair of retaining rings for engaging the bosses on the collars for retaining the same for rotational movement while preventing translational movement of the collars relative to the body member.

4. Apparatus as claimed in claim 3 including a circumferential recess on each of said bosses for engaging said retaining rings.

5. Apparatus as claimed in claim 3 including means on said body member for gripping each of said posts to restrict rotational and translational movement of said each post relative to said body member.

6. Apparatus as claimed in claim 4 including means on each of said collars for gripping one of said posts to restrict movement of said one post relative to said each collar.

7. In apparatus for positioning and clamping a pair of posts at right angles to each other of the type having a body member with offset passages at right angles to each other for receiving the posts wherein each of said offset passages comprises a minor bore portion aligned with a major bore portion and a pair of collars for clamping the posts adjacent to the body member, the improvement comprising
  a boss on each of said collars adapted to be inserted into one of said major bore portions of said passages, and
  means for retaining said bosses in said major bore portions of said passages for rotational movement while preventing translational movement of said collars relative to said body member.

8. Apparatus as claimed in claim 7 including a pair of retaining rings for engaging the bosses on the collars for retaining the same for rotational movement while preventing translational movement of the collars relative to the body member.

9. Apparatus as claimed in claim 8 including a circumferential recess on each of said bosses for engaging said retaining rings.

10. Apparatus as claimed in claim 8 including means on said body member for gripping each of said posts to restrict rotational and translational movement of said posts relative to said body member.

11. Apparatus as claimed in claim 9 including means on each of said collars for gripping one of said posts to restrict movement of said one post relative to said each collar.

12. An improved clamp comprising
  a body having a pair of offset passages extending therethrough at right angles to each other, each of said offset passages comprising a minor bore portion aligned with a major bore portion, a first collar adjacent to one of said passages, a second collar adjacent to the other of said passages, a boss on each of collars adapted to be inserted into one of said major bore portions of said passages, and means for retaining said bosses in said major bore portions of said passages for rotational movement while preventing translational movement of said collars relative to said body.

13. Apparatus as claimed in claim 12 including a pair of retaining rings for engaging the bosses on the collars for retaining the same for rotational movement while preventing translational movement of the collars relative to the body.

14. Apparatus as claimed in claim 13 including a circumferential recess on each of said bosses for engaging said retaining rings.

* * * * *